United States Patent

Wewers et al.

Patent Number: 5,204,433
Date of Patent: Apr. 20, 1993

[54] USE OF EPOXYPOLYSILOXANES MODIFIED WITH OXYALKYLENE ETHER GROUPS AS A CURABLE COATING AGENT

[75] Inventors: Dieter Wewers, Bottrop; Christian Weitemeyer, Essen; Jürgen Jachmann, Herne, all of Fed. Rep. of Germany

[73] Assignee: Th. Goldschmidt AG, Essen, Fed. Rep. of Germany

[21] Appl. No.: 730,279

[22] Filed: Jul. 15, 1991

[30] Foreign Application Priority Data

Jul. 21, 1990 [DE] Fed. Rep. of Germany ....... 4023247

[51] Int. Cl.$^5$ ............................................. C08G 77/06
[52] U.S. Cl. ..................................... 528/12; 528/15; 528/16; 528/17; 528/19; 528/23; 528/21; 528/27; 427/387
[58] Field of Search ............... 528/27, 21, 15, 16, 528/17, 19, 12, 23; 427/387

[56] References Cited

U.S. PATENT DOCUMENTS

| | | |
|---|---|---|
| 4,310,469 | 1/1982 | Crivello . |
| 4,313,988 | 2/1982 | Koshar et al. . |
| 4,394,403 | 7/1983 | Smith . |
| 4,490,416 | 12/1984 | Westall et al. ................ 427/387 |
| 4,987,158 | 1/1991 | Eckberg ........................ 528/19 |

FOREIGN PATENT DOCUMENTS 0334068 9/1989 European Pat. Off. .
0343304 11/1989 European Pat. Off. .
0391162 10/1990 European Pat. Off. .

Primary Examiner—Melvyn I. Marquis
Attorney, Agent, or Firm—Anderson Kill Olick & Oshinsky

[57] ABSTRACT

Curable organopolysiloxanes with epoxy groups are disclosed which contain additionally at least one group of the formula $$[-O-((C_nH_{2n}O-)_x)_y]_zR^3-O-((C_nH_{2n}O-)_x)_yH$$

wherein
$R^3$ is a divalent alkylene group with 2 to 11 carbon atoms,
z is 0 or 1
y is 0 or 1
z+y is 1 or 2
n has an average value of 2 to 3 in the average molecule, the absolute value of n being 2, 3 or 4 and
x has a value of 1 to 200.

The organopolysiloxanes which contain the additional group are useful as curable coating agents with adhesive properties when used alone or in admixture with curable compounds which have epoxy groups, particularly organopolysiloxanes which contain epoxy groups, but are free of the aforementioned additional group. The organopolysiloxanes are used in combination with catalytically acting curing agents.

7 Claims, No Drawings

USE OF EPOXYPOLYSILOXANES MODIFIED WITH OXYALKYLENE ETHER GROUPS AS A CURABLE COATING AGENT

BACKGROUND OF THE INVENTION

This invention relates to curable organopolysiloxanes which contain oxyalkylene ether groups as well as epoxy groups to be used as curable coating agents with abhesive properties.

There is an extensive patent literature which deals with curable epoxysiloxanes and their use as coating agents. Of the large number of patents, U.S. Pat. No. 4,313,988 is named initially. In this patent, a product is described which consists of a support tape with a pressure-sensitive adhesive. On one side of the tape, a layer of a normally adhering and pressure-sensitive adhesive is provided and on the other surface, a material with abhesive properties is disposed. This material consists of a curable epoxypolysiloxane either in solution or in 100% form, which corresponds to the formula

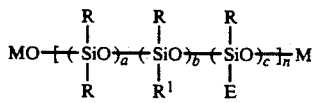

In this formula
R represents a low molecular weight alkyl group with 1 to 3 carbon atoms;
$R^1$ represents a monovalent hydrocarbon group with 4 to 20 carbon atoms;
E is a monovalent hydrocarbon group containing epoxy groups;
M is a silyl group having the formula $R_3Si-$; $R_2R^1Si-$ or $R_2ESi-$, R, $R^1$ and E being as defined above;
a has a value of 5 to 200;
b is 0 or has a value up to 20% that of a and a+b is 5 to 200;
c can assume the value 0 when M is the $R_2ESi$ group, or is larger than 0 but smaller than 20% of the value of a+b when M is the $RSi-$, $R_2R^1Si-$ or $R_2ESi-$ group and
n has a value of 1 to 75,
with the proviso that the monovalent hydrocarbon group E, which contains epoxy groups, contains at least one polymerizable epoxy group of the formula

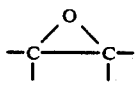

The rest of the E group consists of carbon and hydrogen atoms and is free of acetylenic unsaturations. In addition to the oxiran ether oxygen, a carbonyl oxygen or the

group can be present.

Also, the preparation can contain up to 98% by weight, based on epoxypolysiloxane, of an epoxysilane.

It is pointed out in the aforementioned U.S. Pat. No. 4,313,988 that, according to the state of the art, coatings with abhesive properties, that is, with release properties towards adhesives, are widely used. Dimethylpolysiloxanes provide coatings from which an adhesive tape can be pulled off with the low release force of 4 to 16 g/cm of tape width. This measure indicates the force which must be employed to pull a 1 cm wide adhesive tape from the abhesively finished surface. If, however, adhesive tapes are to be produced, for example, in roll form, and to be finished abhesively, this degree of abhesiveness is too high, since it leads to instabilities of the coiled roll. For such purposes, coatings are desired, the release forces of which, with respect to adhesive tapes, are selective and can be increased, for example to 60 to 350 g/cm and particularly to about 60 to 200 g/cm.

The epoxysiloxanes contain at least one polymerizable epoxy group of the formula

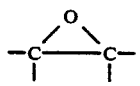

The following can be named as examples of such epoxy groups:

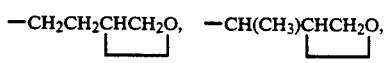

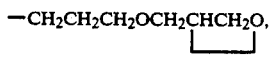

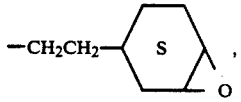

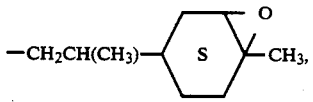

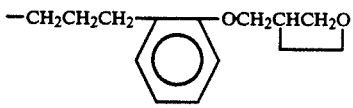

The epoxy groups preferably are located terminally at the hydrocarbon group.

Preferred epoxypolysiloxanes of U.S. Pat. No. 4,313,988 are those of the formula

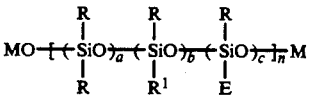

wherein R is a methyl group, b has a value of 0 and the E group is a β-(3,4-epoxycyclohexyl)ethyl or a c-glycidoxypropyl group.

Curing of epoxypolysiloxanes or preparations which contain such epoxypolysiloxanes is accomplished by addition and in the presence of conventional epoxy curing catalysts. Examples of such catalysts are tertiary amines, Lewis acids, such as $BF_3$, and their complexes, such as those with ethers or amines, and polyaromatic iodonium and sulfonium complex salts, which contain $SbF_6^-$ or $BF_4^-$ anions as anions. Organic acids and their salts or derivatives can also be used as curing agents, such as perfluorinated sulfonic acids.

Suitable curing agents are also described in U.S. Pat. Nos. 4,394,403 and 4,310,469.

Very frequently, however, when adding the curing agent, it is observed that, depending on the structure of the preparation and particularly of the siloxanes, the miscibility and solubility of the photoinitiators (curing agents) are limited. Epoxy-functional siloxanes have already been modified in order to improve their compatibility with onium salt photoinitiators. For Example, in EP-A-0 334 068, epoxy-functional siloxanes are described, a portion of the epoxy groups of which was esterified by reaction with aromatic acids, such as benzoic acid, or unsaturated acids, such as acrylic acid. By these means, the compatibility of the epoxysiloxanes with the curing catalysts was increased. At the same time, however, the content of curable epoxy groups was decreased. Epoxy groups are reactive groups which can be activated to polymerize by weaker acids. This makes it exceedingly difficult to control the reaction. In the extreme case, the reaction can become uncontrolled and lead to gelling. Moreover, residual acid contents must be eliminated in order to ensure a long shelf life.

From EP-A-O 343 304, a polishing cloth and wiper is known which contains a wetting agent, which confers permanent hydrophilicity on the cloth. Such a wetting agent can be an organosilicon compound of the formula $MD_xD'_yD''_zM$.

In this formula:

M represents a terminal group having the formula $A_3SiO_{\frac{1}{2}}$, in which A is a monovalent organic group, which is free of olefinic double bonds or hydroxyl groups and is linked directly to the silicon atom. M can also be an alkoxy group with 1 to 13 carbon atoms.

D is a unit having the formula $R_2SiO$, in which R is a hydrocarbon group and may not contain any $C\equiv C$ bonds.

D' is a unit having the formula $RR'SiO$, in which R once again is a monovalent hydrocarbon group, which may not contain any $C\equiv C$ groups.

R' is a polyoxyalkylene unit of the formula

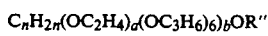

$C_nH_{2n}(OC_2H_4)_a(OC_3H_6)_b OR''$ wherein

R'' is a hydrogen group, an acyl group with 1 to 8 carbon atoms or a monovalent hydrocarbon group with 1 to 13 carbon atoms, n is a whole number with an average value of 1 to 8, a and b are whole numbers, the sum of which has a value of 5 to 200 and the product $a/(a+b)$ has a value of 1.0 to 0.

D'' is a unit having the formula $R'''SiO$, in which R is a univalent hydrocarbon group, which is free of $C\equiv C$ bonds. R''' is a monovalent organic group, which has at least one vicinal epoxy group.

x is a whole number with an average value of 10 to 5,000; y is a whole number with an average value of 1 to x and z is a whole number with an average value of 1 to 0.5x, with the proviso that the sum of y+z does not exceed 0.75x.

The modified silicones which are described in EP-A-O 343 304 are used as hydrophilic wetting agents. Their usefulness for the preparation of curable coating compositions with abhesive properties cannot be inferred from this publication.

SUMMARY OF THE INVENTION

An object of the invention is to provide curable organopolysiloxanes which contain epoxy groups and exhibit good compatibility with respect to photoinitiators, without having the disadvantages mentioned above.

Another object of the invention is to provide epoxysiloxanes with improved adhesion to the substrate by modifying them and, at the same time, to provide an opportunity for modifying the release properties in accordance with the application, that is, to adjust them for the purpose for which they are intended.

It has now been found that modified organopolysiloxanes, which have a particular structure and contain epoxy groups, fulfill these requirements.

The curable organopolysiloxanes which contain epoxy groups and additionally, at least one group linked to a silicon atom of the polysiloxane of the formula $$[-O-((C_nH_{2n}O-)_x)_y]_zR^3-O-((C_nH_{2n}O-)_x)_yH \quad I$$

wherein $R^3$ is a divalent alkylene group with 2 to 11 carbon atoms, z is 0 or 1, y is 0 or 1, z+y is 1 or 2, n has an average value of 2 to 3 in the average molecule, the absolute values of n being 2, 3 or 4 and x has a value of 1 to 200, are used alone or in admixture with curable compounds which have epoxy groups, particularly organopolysiloxanes which contain epoxy groups but are free of the aforementioned group, as curable coating agents with abhesive properties. The curable organopolysiloxanes are used together with a curing agent capable of curing epoxy groups.

DESCRIPTION OF THE INVENTION

Examples of the $R^3$ groups of formula I are the $-CH_2CH_2-$, $-CH_2CH_2CH_2-$; —

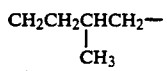

$CH_2CH_2CHCH_2-$
|
$CH_3$ and $-(CH_2)_{11}-$ groups. The $R^3$ group can be linked directly to a silicon atom of the organopolysiloxane. In this case, z=0. If z=1 and y=0, $R^3$ is linked over an oxygen atom to a silicon atom of the organopolysiloxane.

In the modifying group of formula I, n has an absolute value of 2, 3 or 4. Accordingly, oxyethylene, oxypropylene and/or oxybutylene groups are present. However, in the average molecule, the average value of n is 2 to 3 and particularly 2 to 2.6.

The number of oxyalkylene units is given by subscript x, which has a value of 1 to 200, preferably of 1 to 100 and particularly of 5 to 50.

It is of particular importance that the above-mentioned modifying group has a terminal OH group. During the curing, this OH group can react with the epoxy groups.

Due to the introduction of the above-described modifying group of formula I, the compatibility of the modified siloxanes towards photoinitiators is improved and the adhesion of the epoxysiloxanes to the substrate is improved. By varying the subscripts n, x and y, the release forces of the cured epoxysiloxanes can, moreover, be varied. The release forces are generally increased if y=1 and x assumes high and n low values.

According to the invention, the use of oxyalkylene-modified organopolysiloxanes which have epoxy groups and correspond to the following average formula is particularly preferred.

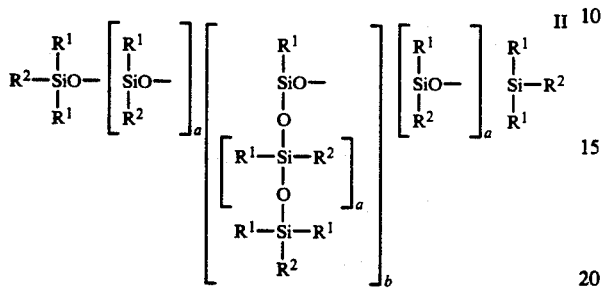
II

In the above formula:
- $R^1$ can be the same or different in the polysiloxane molecule and represents alkyl groups with 1 to 4 carbon atoms; examples of such groups are methyl, ethyl, propyl or butyl groups but at least 90% of the $R^1$ groups and particularly 100% of the $R^1$ groups are methyl groups;
- $R_2$ can be an alkyl group with 1 to 20 carbon atoms, an aryl group or an aralkyl group; examples of alkyl groups are methyl, ethyl, propyl, butyl, hexyl, decyl, dodecyl, hexadecyl or octadecyl groups; the phenyl group particularly comes into consideration as an aryl group and the benzyl group as an aralkyl group;
- $R_2$ can also be an epoxy group, which is linked over an Si—C bond to the silicon atom of the polysiloxane; examples of such epoxy groups are already named in the description of the state of the art;
- $R_2$ can furthermore correspond to formula I, in which $R^3$ has the meaning given above and the subscripts n, x, y and z have the already given values; and subscript a indicates the number of chain-forming difunctional siloxy units and has a value of 1 to 1,000 and preferably of 5 to 200 and b indicates the number of trifunctional, branched siloxy units and has a value of 0 to 10 and preferably of 0 to 2.

Examples of the modified organopolysiloxanes having epoxy groups which are to be used according to the invention are illustrated by the following compounds.

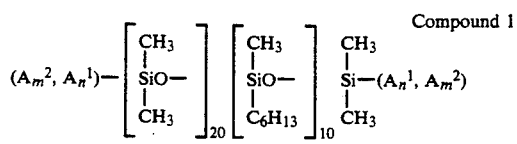
Compound 1

$A^1 =$

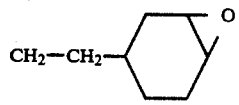

$A^2 = (CH_2)_3 - O(C_2H_4O)_8 - H$
$n = 0.5$
$m = 0.5$

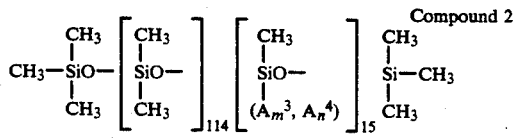
Compound 2

$A^3 =$

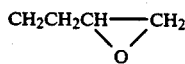

$A^4 = -O(C_2H_4O)_2H$
$m = 0.7$
$n = 0.3$

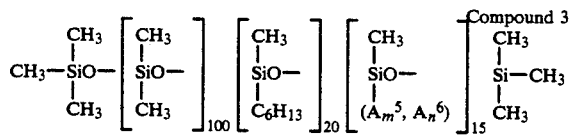
Compound 3

$A^5 =$

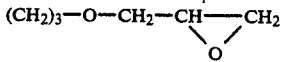

$A^6 = -O(C_2H_4O)_{10} - C_4H_8 - O(C_2H_4O)_{10} - H$
$m = 0.7$
$n = 0.3$

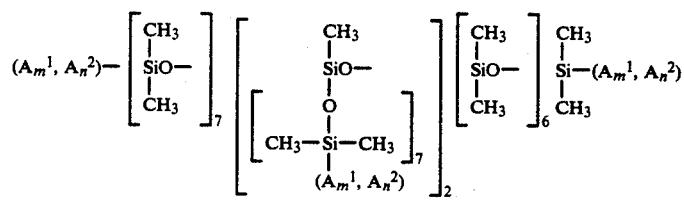
Compound 4

$A^1$, $A^2$ as defined for compound 1
$m = 0.75$
$n = 0.25$

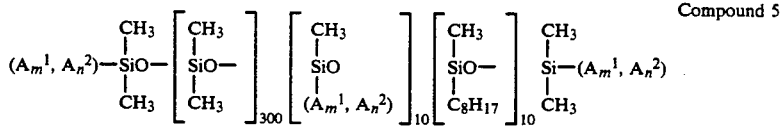

$A^1$, $A^2$ as defined for compound 1
m = 0.8
n = 0.2

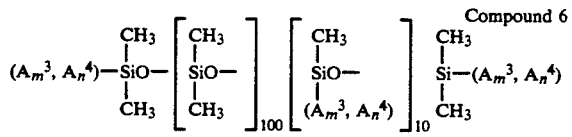

$A^3$, $A^4$ as defined for compound 2
m = 0.8
n = 0.2

In the finally mentioned European patent application, EP-A-O 391 162 A2, a photopolymerizable preparation for coating is claimed, which contains as component (A), an epoxy-functional diorganopolysiloxane of the formula

wherein
R is an alkyl group with 1 to 8 carbon atoms
R' is the same as R or is a monovalent, epoxy-function organic group with 2 to 20 carbon atoms, with the proviso that at least two R' groups are monovalent, epoxy-functional organic groups and x has a value of 0 to 20.

In contrast to the compounds of European patent application EP-A-0 391 162 A2, the organopolysiloxane compounds containing epoxy groups used according to the invention, additionally contain at least one group of the formula

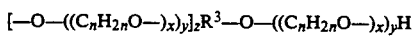

which is linked to a silicon atom of the polysiloxane. This group directly affects the compatibility of the epoxysiloxane with photoinitiators and improves adhesion of the cured siloxanes to the substrates and improves their abhesiveness.

The organopolysiloxanes of the invention are particularly useful as coatings which develop a release effect with respect to pressure-sensitive adhesives of labels, decorative laminates, transfer papers and transfer tapes. In addition, they can be used to produce nonadhesive packing material for foods and as industrial packing materials. For this purpose, support sheets for the adhesive coatings are used, particularly paper sheets or films of polyethylene, polypropylene or polyester.

Also, the organopolysiloxanes used according to the invention are advantageous for the production of printing inks and decorative coatings.

A further preferred use of the organopolysiloxanes of the invention is as casting compositions, for which purpose they are used either alone or in admixture with other curable compounds. These casting compositions are used especially for electric or electronic components, printed circuit board assemblies, switching elements, male connectors etc., which are exposed to aggressive media, moisture, etc.

The compounds or mixtures thereof used according to the invention are also useful as coat glass fibers which are intended especially for the manufacture of optical wave guides. The coating protects the glass fibers against damage and harmful external effects and, at the same time, affects the reflection of the glass fibers.

The modified organopolysiloxanes having curable epoxy groups according to the invention can be used by themselves as curable coating materials after the addition of conventional photoinitiators, which are added in an amount of 0.01 to 10% by weight, based on the organopolysiloxanes. If necessary, these preparations can contain solvents so that they can be applied more readily. However, solvent-free preparations are preferred. Organopolysiloxanes used according to the invention can, however, also be added to conventional organopolysiloxanes which contain epoxy groups of the state of the art, in order to affect and modify the properties of these latter organopolysiloxanes during the common curing.

Generally, and as stated above in connection with the description of the prior art, the curing of epoxypolysiloxanes is accomplished by catalysts. For the purposes of this invention, 0.01 to 10% by weight of catalytically acting curing agents of the following kind are advantageously used:

(a) amines, such as bis(2-aminoethyl)amine, tributylamine, diethylenetriamine, tetramethylguanidine, 1.4-diazabicyclo(2,2,2,)octane;

(b) inorganic and organic Bronstedt-acids, such as $HClO_4$, $HSO_4$, HCl, trifluoromethanesulfonic acid, acetic acid, oxalic acid, trichloroacetic acid and their salts;

(c) carboxcylic acid anhydrides, such as acetic acid anhydride, maleic acid anhydride, phthalic acid anhydride;

(d) Lewis-acids, such as $AlCl_3$, $TiCl_4$, $BF_3$, $FeCl_3$, $PF_5$, $POCl_3$, Di-alkyl-AlCl and their complex compounds with ethers, amines, alkyl chlorides and the like, such as, for example, $BF_3.O(C_2H_5)_2$ and $PF_5.N(C_2H_5)_3$;

(e) polyaromatic radiation sensitive onium-salts, such as carbonium-, diazonium-, iodonium- and sulfonium salts with complex anions from, for example, the groups $BF_4^-$, $PF_6^-$, $AsF_6^-$, $SbF_6^-$, $FeCl_4^-$, and $SbCl_5^-$. Examples are tritylcarboniumtetrafluoroborate $(C_6H_5)_3C^+BF_4^-$, bis(dodecylphenyl)iodoniumhexafluoroantimonate, bis(4-(diphenylsulfonium)-phenyl)-sulfide-bis-hexafluorophosphate;

(f) the onium salts of group (e) in combination with co-catalysts such as, for example, Cu-salts (such as $CuCO_3$), which act as thermal curing catalysts.

In the following examples, which further illustrate the invention, the synthesis of the modified organopolysiloxanes having epoxy groups of invention is described first. In the subsequent, practical comparison trials, the properties of the organopolysiloxanes used according to the invention ar compared with those of organopolysi-

EXAMPLE 1

To a mixture of 486 g (4.0 moles) of vinylcyclohexene oxide, 1,071 g (2.6 moles) of allyl polyether and 16 mg of $H_2PtCl_6 \cdot 6H_2O$, 1,942 g (1 mole) of a polydimethylsiloxane which contains Si—H groups are added dropwise at 120° C. At the end of the dropwise addition, stirring is continued for a further 8 hours at 13° C. After filtration and drawing off the volatile reaction products at 12° C./0.1 mbar, 3,164 g (94% of the theoretical yield) of a moderately viscous oil are obtained, which, according to the $^1$H-NMR spectrum, has the formula

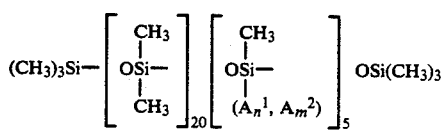

$A^1$, $A^2$ are defined as in compound 1
n = 0.6
m = 0.4.

EXAMPLE 2

As in Example 1, 376 g (3.3 moles) of allyl glycidyl ether, 1,359 g (3.3 moles) of allyl polyether and 2,330 g (1.2 moles) of a polydimethylsiloxane containing Si—H groups are reacted to form a polydimethylsiloxane of the formula

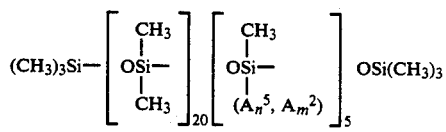

$A^5$ is defined as in compound 3
$A^2$ is defined as in compound 1
n = 0.5
m = 0.5.

EXAMPLE 3

As in Example 1, 50 g (0.4 moles) of vinylcyclohexene oxide, 107 g (0.26 moles) of allyl polyether and 1,159 g (0.1 moles) of a polydimethylsiloxane which contains Si—H groups, are reacted to form a polydimethylsiloxane of the average formula

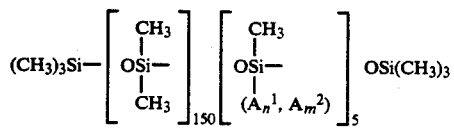

$A^1$, $A^2$ are defined as in compound 1
n = 0.6
m = 0.4.

EXAMPLE 4

As in Example 1, 136 g (1.1 moles) of vinylcyclohexene oxide, 453 g (1.1 moles) of allyl polyether and 2,980 g (1 mole) of an organopolysiloxane which contains Si—H groups, are reacted to form an organopolysiloxane of the average formula

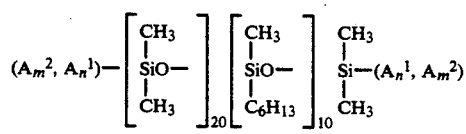

$A^1$, $A^2$ are defined as in compound 1
n = 0.5
m = 0.5

EXAMPLE 5

To an amount of 950 g (0.1 moles) of a polydimethylsiloxane which contains Si—H groups, 16 mg of $H_2PtCl_6 \cdot 6H_2O$ are added at 120° C. and 32 g 0.45 moles) of butadiene monoepoxide are added dropwise. After 5 hours at 120° C., 2 g of CsF are added and 150 g (1.05 moles) of diethylene glycol are added dropwise and stirred for 15 hours at this temperature, until the evolution of hydrogen can no longer be detected. After that, the reaction mixture is filtered and volatile components are removed at 12° C./0.1 mbar. Yield = 1,020 g.

According to $^1$H-NMR spectroscopy, the oil of moderate viscosity has the following average formula:

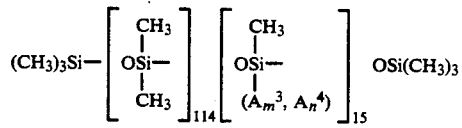

$A^3$, $A^4$ are defined as in compound 2
m = 0.7
n = 0.3

EXAMPLE 6

As in Example 5, 120 g (1.05 moles) of allyl glycidyl ether, 437 g 0.45 moles) of a polyether and 1,134 g (0.1 moles) of an organopolysiloxane which contains Si—H groups are reacted to form an organopolysiloxane of the following average formula:

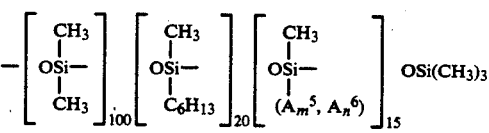

$A^5$, $A^6$ are defined as in compound 3
m = 0.7
n = 0.3

EXAMPLE 7

As in Example 1, 41 g (0.33 moles) of vinylcyclohexene oxide, 46.3 g 0.11 moles) of allyl polyether and 219 g (0.1 moles) of a polydimethylsiloxane which contains Si—H groups are reacted to form a polydimethylsiloxane of the following average formula:

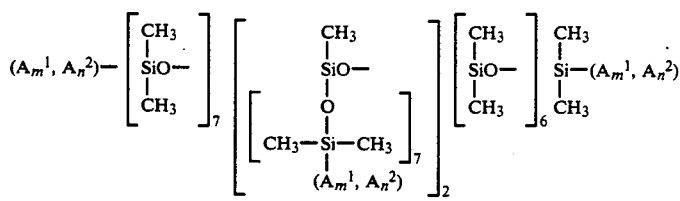

$A^1, A^2$ are defined as in compound 1
m=0.75
n=0.25.

EXAMPLE 8

As in Example 1, 130 g (1.0 moles) of vinylcyclohexene oxide, 110 g (0.3 moles) of allyl polyether and 2,465 g (0.1 moles) of an organopolysiloxane which contains SiH groups are reacted to form an organopolysiloxane which has the following average structure:

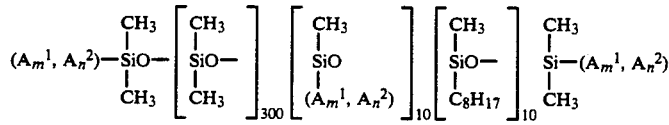

$A^1, A^2$ are defined as in compound 1
m=0.8
n=0.2.

EXAMPLE 9

As in Example 5, 70 g (1 mole) of butadiene monoepoxide, 34 g of diethylene glycol and 813 g of a polydimethylsiloxane which contains Si—H groups are reacted to form an organopolysiloxane having the following average formula:

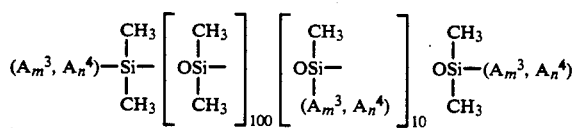

$A^3, A^4$ are defined as in compound 2
m=0.8
n=0.2.

EXPERIMENTAL EXAMPLES 1 TO 3 (NOT OF THE INVENTION)

As in Example 1, vinylcyclohexene oxide and polydimethylsiloxanes which contain SiH groups are reacted to form organopolysiloxane of the following formulas:

EXPERIMENTAL EXAMPLE 1

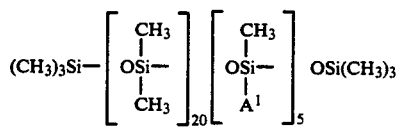

EXPERIMENTAL EXAMPLE 2

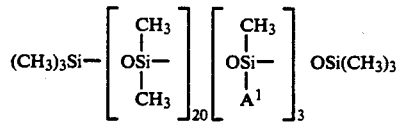

EXPERIMENTAL EXAMPLE 3

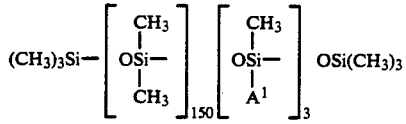

TESTS OF THE PROPERTIES OF THE MODIFIED POLYSILOXANES OF THE INVENTION

To check the application properties of the polysiloxanes which have been modified according to the invention, compounds 1 to 9 are mixed with 1% by weight of bis(dodecylphenyl)iodonium hexafluoroantimonate, applied on an oriented polypropylene film and cured with a Fusion UV lamp (120 W/cm). The amount applied in each case is about 1.1 g/cm². Various 80 mm wide adhesive tapes are used for the comparison examples. These adhesive tapes are coated with acrylate adhesives and are obtainable commercially under the names of Tesa ®154 and Tesa ®970. A further adhesive tape used was coated with a rubber adhesive and is obtainable commercially under the name of Tesa ®969.

To measure the abhesiveness, the adhesive tapes are rolled onto the substrate and stored subsequently, in the case of the acrylate adhesive tapes at 70° C. and in the case of the rubber adhesive tapes at 40° C. After 24 hours, the force is measured which is required to pull the respective adhesive tape from the substrate at a peel angle of 180°. This force is referred to as the release force. In addition the adhesion of the modified polysiloxanes to the substrate was checked by rubbing vigorously with the thumb. Rubbery crumbs ar formed if the adhesion is defective (so-called rub off test).

TABLE

| | Modified Siloxane | | | | Oriented Polypropylene Film | | | | | | |
|---|---|---|---|---|---|---|---|---|---|---|---|
| | Chain Length | Epoxy Functionality | OH Functionality | Alkyl Group | Tesa(R) 154 | Tesa(R) 970 | Tesa(R) 969 | Solubility of Photo-initiator | Rub Off | Curing | Surface Oily/greasy |
| | | | | | Release Force (N) | | | | | | |
| Example | | | | | | | | | | | |
| 1 | 27 | 3 | 2 | ./. | 3.7 | 4.1 | 3.9 | very good | no | yes | no |
| 2 | 27 | 2.5 | 2.5 | ./. | 2.4 | 2.7 | 2.7 | very good | no | yes | no |
| 3 | 157 | 3 | 2 | ./. | 0.8 | 0.89 | 0.87 | good | no | yes | no |
| 4 | 31 | 1 | 1 | $C_6H_{13}$ | 2.0 | 2.3 | 2.1 | very good | no | yes | no |
| 5 | 131 | 10.5 | 4.5 | ./. | 0.85 | 0.9 | 0.92 | good | no | yes | no |
| 6 | 137 | 10.5 | 4.5 | $C_6H_{13}$ | 1.2 | 1.3 | 1.5 | good | no | yes | no |
| 7 | ./. | 3 | 1 | ./. | 3.4 | 4.0 | 6.7 | very good | no | yes | no |
| 8 | 322 | 9.6 | 2.4 | $C_8H_{17}$ | 0.1 | 0.15 | 0.12 | moderate | no | yes | no |
| 9 | 112 | 9.6 | 2.4 | ./. | 1.0 | 0.9 | 0.9 | good | no | yes | no |
| Comparison Example (non-inventive) | | | | | | | | | | | |
| 1 | 27 | 5 | 0 | ./. | 1.9 | 2.2 | 2.2 | moderate | ./. | yes | no |
| 2 | 25 | 3 | 0 | ./. | ./. | ./. | ./. | poor | ./. | no | yes |
| 3 | 155 | 3 | 0 | ./. | ./. | ./. | ./. | very poor | ./. | no | yes |

As shown from the results set forth in the foregoing table, the organopolysiloxanes which have been modified according to the invention have the desired application properties. The compositions of the invention show good adhesion to the support, can be cured rapidly, show good abhesion properties towards adhesives of chemically different structure, show good compatibility with photoinitiators and in contrast to the state of the art organopolysiloxanes, can be adapted to the chemical character of the adhesive by choosing suitable substituents, while keeping the siloxane framework the same.

It is particularly striking that the organopolysiloxanes which have been modified according to the invention still cure rapidly, despite a lower epoxy functionality. This is due to a synergism between the epoxy groups and the $R^3$—OH group.

We claim:
1. A curable preparation comprising
   (a) between about 90.00 to 99.99% by weight of a curable organopolysiloxane with epoxy groups and
   (b) between about 0.01 to 10% by weight of a curing agent capable of curing epoxy groups, wherein the organopolysiloxane has the average formula

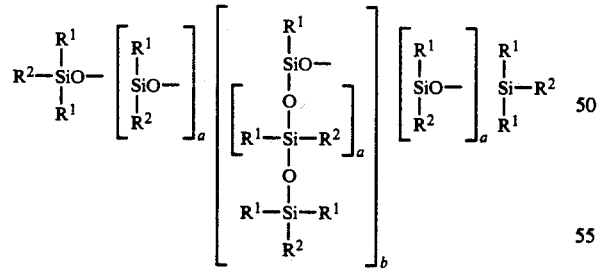

wherein
$R^1$ is the same or different in the molecule and represents an alkyl group with 1 to 4 carbon atoms, with the proviso that at least 90% of the $R^1$ groups are methyl groups
$R^2$ is selected from
   (a) an alkyl group with 1 to 20 carbon atoms, an aryl group or aralkyl group,
   (b) an epoxy group linked by way of an Si—C bond to a silicon atom of the organopolysiloxane, or
   (c) a group of the formula

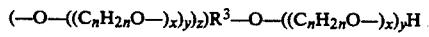

wherein
$R^3$ is a divalent alkylene group with 2 to 11 carbon atoms,
z is 0 or 1
y is 0 or 1
z+y is 1 or 2
n has an average value of 2 to 3 in the average molecule, the absolute value of n being 2, 3 or 4 and
x has a value of 1 to 200,
a has a value of 1 to 1,000 and
b has a value of 0 to 10,
with the proviso that at least one $R^2$ group is selected from b) and at least one $R^2$ is selected from c) in the average organopolysiloxane molecule.

2. The curable organopolysiloxane as defined in claim 1 in which $R^1$ represents methyl groups, a has a value of 5 to 200 and b has a value of 0 to 2.

3. The curable preparation of claim 1, wherein the curing agent is selected from one of the following:
   (a) an amine;
   (b) an inorganic or organic Bronstadt acid;
   (c) a carboxylic acid anhydride;
   (d) a Lewis acid or a Lewis acid complex with ether, amine or alkyl chloride;
   (e) a polyaromatic radiation sensitive onium salt with complex anions; or
   (f) the onium salts of group (e) in combination with thermal curing catalysts.

4. A composition comprising the curable organopolysiloxane defined in claim 1 in admixture with a curable organopolysiloxane compound which contains epoxy groups but is free of the group of the formula

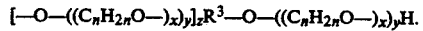

5. A composition comprising the curable organopolysiloxane defined in claim 2 in admixture with a curable organopolysiloxane compound which contains epoxy groups but is free of the group of the formula

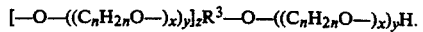

6. A method of forming an abhesive coating on a substrate comprising applying a curable preparation as defined in claim 1 or 2 on said substrate and curing the preparation.

7. A method of forming an abhesive coating on a substrate comprising applying a composition as defined in claims 4 or 5 on said substrate and curing the composition.

* * * * *